United States Patent

Tada et al.

[11] Patent Number: 4,959,438
[45] Date of Patent: Sep. 25, 1990

[54] EPOXY RESIN COMPOSITION AND PREPREG FOR COMPOSITE MATERIALS USING THE SAME FROM BI AND TRI-EPOXIDES, TRIARYLBISPHENOLS AND DIAMINODIPHENYLSULFONES

[75] Inventors: Hisashi Tada; Akira Agata, both of Aichi; Masahiro Saruta, Hiroshima; Takashi Murata, Aichi, all of Japan

[73] Assignee: Mitsubishi Rayon Company, Ltd., Tokyo, Japan

[21] Appl. No.: 302,199

[22] Filed: Jan. 27, 1989

[30] Foreign Application Priority Data

Jan. 29, 1988 [JP] Japan .................................. 63-18779

[51] Int. Cl.$^5$ ........................ C08G 59/56; C08G 59/62
[52] U.S. Cl. ..................................... 528/98; 428/413; 523/400; 523/428; 523/445; 523/466; 523/468; 525/423
[58] Field of Search ........................... 528/98; 428/413

[56] References Cited

FOREIGN PATENT DOCUMENTS 0199606 10/1986 European Pat. Off. ............. 528/99
0217657 4/1987 European Pat. Off. ............. 528/99
51-5400 1/1976 Japan .................................. 528/99

*Primary Examiner*—John Kight, III
*Assistant Examiner*—Frederick Krass
*Attorney, Agent, or Firm*—Oblon, Spivak, McClelland, Maier & Neustadt

[57] ABSTRACT

An epoxy resin composition is disclosed, which comprises the following elements:
(A) a bifunctional epoxy resin;
(B) a trifunctional epoxy resin;
(C) a phenolic compound represented by the following general formula:

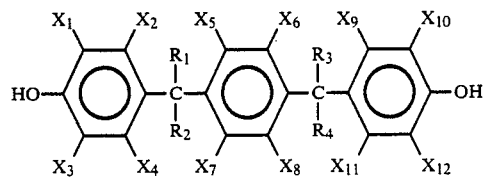

wherein $X_1$, $X_2$, $X_3$, $X_4$, $X_5$, $X_6$, $X_7$, $X_8$, $X_9$, $X_{10}$, $X_{11}$, $X_{12}$, $R_1$, $R_2$, $R_3$ and $R_4$, which may be the same or different, each represents a hydrogen atom or a methyl group; and
(D) 4,4'-diaminodiphenyl sulfone or 3,3'-diaminodiphenyl sulfone, wherein the molar ratio of epoxy groups in element (A) to those in element (B) is in the range of from 1/4.0 to 1/0.1, element (C) is used in an amount that satisfies the condition:

$$1/0.9 \leq (A+B)/C \leq 1/0.1$$

and element (D) is used in an amount that satisfies the condition:

$$1/1.3 \leq (A+B-C)/D \leq 1/0.8$$

wherein A represents the number of epoxy groups by moles in element (A), B represents the number of epoxy groups by moles in element (B), C represents the number of phenolic hydroxyl groups by moles in element (C), and D represents the number of NH groups by moles in element (D).

A prepreg for composite materials is also disclosed, wherein the prepreg comprises reinforcing fibers impregnated with the epoxy resin composition described above.

22 Claims, No Drawings

EPOXY RESIN COMPOSITION AND PREPREG FOR COMPOSITE MATERIALS USING THE SAME FROM BI AND TRI-EPOXIDES, TRIARYLBISPHENOLS AND DIAMINODIPHENYLSULFONES

FIELD OF THE INVENTION

The present invention relates to an epoxy resin composition for use in prepreg for a composite material, that imparts excellent storage stability, hot wet property and improved compression strength after impact. Composite materials produced from this resin composition are useful not only in an aircraft component but also in an automotive component and other industrial applications.

BACKGROUND OF THE INVENTION

Because of their excellent adhesion and rigidity properties, epoxy resins have been used extensively as matrix resins for composite materials. In particular, a composition that is mainly composed of N,N,N',N'-tetraglycidyl diaminodiphenylmethane and 4,4'-diaminodiphenyl sulfone has been used most extensively since 1972 as a matrix resin for high-performance composite materials.

However, the elongation of this resin composition is so small that composite materials produced by thermally curing the prepreg made of it are incapable of stretching in conformity with carbon fibers, aramid fibers, glass fibers or other recently developed high-elongation reinforcing fibers having an elongation at break of 1.5% or more. In other words, these composite materials have a lower tensile elongation than the reinforcing fibers. Although they exhibit satisfactory compressive strength at about 82° C. after moisture absorption, their compressive strength after impact is too low to justify their use as primary structural materials.

Materials having high compressive strength after impact have been reported in the 5th SAMPE European Chapter (1984) Paper 15 (T. Tattersall), but they are far from being suitable for practical use because, for one thing, they do not have satisfactory compressive strength after moisture absorption and, for another, the volume fraction of fibers cannot be increased on account of the need to insert interleaves or intermediate layers.

Under these circumstances, the present inventors conducted intensive studies in order to develop an epoxy resin composition which is used in prepreg for a composite material that would impart excellent compressive strength characteristics both at about 82° C. after moisture absorption ($\geq 110$ kg/mm$^2$) and after impact ($\geq 27$ kg/mm$^2$). The present invention has been accomplished on the basis of these efforts.

SUMMARY OF THE INVENTION

In one aspect, the present invention relates to an epoxy resin composition which comprises the following elements:
(A) a bifunctional epoxy resin;
(B) a trifunctional epoxy resin;
(C) a phenolic compound represented by the following general formula:

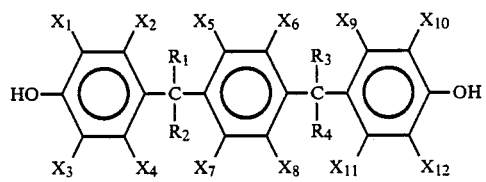

wherein $X_1$, $X_2$, $X_3$, $X_4$, $X_5$, $X_6$, $X_7$, $X_8$, $X_9$, $X_{10}$, $X_{11}$, $X_{12}$, $R_1$, $R_2$, $R_3$ and $R_4$, which may be the same or different, each represents a hydrogen atom or a methyl group; and
(D) 4,4'-diaminodiphenyl sulfone or 3,3'-diaminodiphenyl sulfone, wherein the molar ratio of epoxy groups in element (A) to those in element (B) is in the range of from 1/4.0 to 1/0.1, element (C) is used in an amount that satisfies the condition:

$$1/0.9 \leq (A+B)/C \leq 1/0.1$$

and element (D) is used in an amount that satisfies the condition:

$$1/1.3 \leq (A+B-C)/D \leq 1/0.8$$

wherein A represents the number of epoxy groups by moles in element (A), B represents the number of epoxy groups by moles in element (B), C represents the number of phenolic hydroxyl groups by moles in element (C), and D represents the number of NH groups by moles in element (D).

In another aspect, the present invention relates to a prepreg for composite materials, wherein the prepreg comprises reinforcing fibers impregnated with the epoxy resin composition described above.

In a preferred embodiment, all or part of element (A) and all of element (B) are pre-reacted with element (C) under the condition that at least 80% of the phenolic hydroxyl groups in element (C) reacts with the epoxy groups in elements (A) and (B).

DETAILED DESCRIPTION OF THE INVENTION

Examples of the bifunctional epoxy resin (A) used in the present invention include a bisphenol epoxy type resin such as a bisphenol A type epoxy resin, a bisphenol F type epoxy resin, brominated products thereof, and a bisphenol S type epoxy resin. For example, bisphenol epoxy type resin is represented by the following general formula:

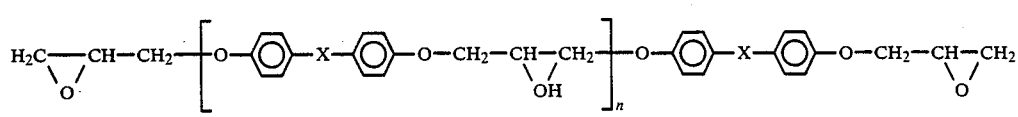

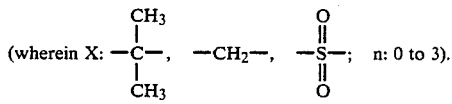

(wherein X: $-\underset{\underset{CH_3}{|}}{\overset{\overset{CH_3}{|}}{C}}-$, $-CH_2-$, $-\underset{\underset{O}{\parallel}}{\overset{\overset{O}{\parallel}}{S}}-$; n: 0 to 3).

For providing improved toughness, a bisphenol A type epoxy resin or a bisphenol F type epoxy resin is desirably used.

Examples of the trifunctional epoxy resin (B) used in the present invention include N,N,O-triglycidyl-p-aminophenol, N,N,O-triglycidyl-m-aminophenol, N,N,O-triglycidyl-4-amino-m-cresol, N,N,O-triglycidyl-5-amino-o-cresol, and 1,1,1-(triglycidyl-oxyphenyl)methane. Among these, N,N,O-triglycidyl compounds are preferably used to provide improved solvent resistance.

The molar ratio of epoxy groups in the bifunctional epoxy resin (A) to those in the trifunctional epoxy resin (B) is in the range of from 1/4.0 to 1/0.1, preferably from 1/3.8 to 1/0.3, when expressed by A/B. If A/B is greater than 1/0.1, not only hot wet property but also solvent resistance is reduced. If A/B is smaller than 1/4.0, toughness is insufficient to prevent the decrease in translation of reinforcing materials(fibers) or compressive strength after impact.

Examples of the phenolic compound of element (C) used in the present invention include 4,4'-(p-phenylenediisopropylidene)bisphenol, 4,4'-(p-phenylenediisopropylidene)bis(2-cresol), and 4,4'-(p-phenylenediisopropylidene)bis(2,6-xylenol). Among these, 4,4'-(p-phenylenediisopropylidene)bis(2,6-xylenol) is preferably used to provide good hot wet property.

Exemplary reinforcing fibers that may be used in the prepreg of the present invention include carbon fibers, glass fibers, aramid fibers, boron fibers, and silicon carbide fibers. Of these, carbon fibers are preferred.

In the present invention, the phenolic compound of element (C) must be used in an amount that satisfies the following condition:

$$1/0.9 \leq (A+B)/C \leq 1/0.1$$

wherein A represents the number of epoxy groups by moles in element (A), B represents the number of epoxy groups by moles in element (B), and C represents the number of phenolic hydroxyl groups by moles in element (C).

If this ratio is greater than 1/0.1, satisfactory hot wet property or toughness is not attainable. If the ratio is less than 1/0.9, heat or solvent resistance is reduced. A preferable range is from 1/0.8 to 1/0.2.

The compound of element (D) used in the present invention must be used in an amount that satisfies the following condition:

$$1/1.3 \leq (A+B-C)/D \leq 1/0.8$$

wherein D represents the number of NH groups by moles in element (D), and A, B and C have the same meaning as above.

If the upper limit of this condition is exceeded, curing is insufficient to ensure satisfactory solvent or heat resistance. If the lower limit of this condition is not reached, water and solvent resistance is reduced.

The epoxy resin composition of the present invention can be prepared by mixing elements (A), (B), (C) and (D) simultaneously, or by mixing a pre-reacted product of elements (A), (B) and (C), unreacted element (A) and element (D). When the epoxy resin composition is prepared by the latter means, all or part of element (A) and all of element (B) are preferably pre-reacted with element (C) under the condition that at least 80%, more preferably at least 90%, of the phenolic hydroxyl groups in element (C) reacts with the epoxy groups in elements (A) and (B).

In order to ensure that the resin composition to be finally obtained will have satisfactory impact resistance, the conversion of phenolic hydroxyl groups by the pre-reaction is preferably adjusted to at least 80%.

In the pre-reaction, the molar ratio of epoxy groups in the bifunctional epoxy resin of element (A) to those in the trifunctional epoxy resin of element (B) is in the range of from 1/4.0 to 1/0.5, preferably from 1/3.7 to 1/0.7, when expressed by A'/B. If A'/B is greater than 1/0.5, satisfactory resistance to hot water or solvents is not attainable. If A'/B is less than 1/4.0, undesirable gelation will occur during the preliminary reaction.

Element (C) for the pre-reaction with elements (A) and (B) is used in an amount that satisfies the following condition:

$$1/1.1 \leq (A'+B)/C \leq 1/0.2$$

wherein A' represents the number of epoxy groups by moles in element (A) in the pre-reaction, and B and C have the same meaning as above.

If the upper limit of this condition is exceeded, satisfactory resistance to hot water or compressive strength after impact is not attainable. If the lower limit of this condition is not reached, the mixture under preliminary reaction becomes too viscous to be handled efficiently.

In the pre-reaction, element (C) is preferably used in an amount that satisfies the following condition:

$$1/1.0 \leq (A'+B)/C \leq 1/0.3$$

wherein A', B and C have the same meaning as above.

The epoxy resin composition of the present invention may contain ingredients other than elements (A), (B), (C) and (D), and such optional ingredients include: inorganic fillers such as a silica powder, a fine silicon oxide powder, and microbaloons; flame retardants such as antimony trioxide; and flow control agents such as phenolterminated polyether sulfone, polyvinyl butyrate, and polyether imide.

The reinforcing fibers, if they are used at all, may be in the form of milled fibers, cut fibers roving, a unidirectionally collimated sheet, a woven or non-woven fabric, or in some other suitable forms.

The following examples are provided for the purpose of further illustrating the present invention. In the examples, all "parts" are on a weight basis.

EXAMPLES

The characteristics of the composite materials fabricated in the examples were measured by the following methods and the results were normalized for a fiber volume fraction of 60%.

Hot wet property

A [0°]₁₆ laminated composite was submerged in hot water at 71° C. for 14 days and thereafter subjected to a compression test in the direction of 0° at 82° C. in accordance with ASTM D-695.

Impact resistance

In accordance with NASA RP 1092, a panel (4×6×0.18 in.) was fixed on a table with a hole (3×5 in.); a weight of 4.9 kg with a ½ inch radius nose was dropped on the center of the panel to give an impact of 1,500 lbs. per inch of panel thickness, and the panel was thereafter subjected to a compression test.

Handling of resin

The handling property of resin compositions was evaluated by finger test in tack at room temperature: "O", soft; "X", hard.

Resistance to MEK

Cured resin samples were immersed in methyl ethyl ketone (MEK) for 7 days at room temperature and the change in their appearance was evaluated: "O", no change; "X", extensive change.

EXAMPLE 1

A hundred parts of Epikote 807 (the trade name of Yuka-Shell Epoxy Co., Ltd. for bisphenol F type epoxy resin; epoxy equivalent, 170), 142 parts of N,N,O-triglycidyl-4-amino-m-cresol (epoxy equivalent, 97), 206 parts of 4,4'-(p-phenylenediisopropylidene)bis(2,6-xylenol) and 63.8 parts of 4,4'-diaminodiphenylsulfone were mixed. To the mixture, 1.25 parts of a fine silicon oxide powder (Aerosil 380 of Japan Aerosil Inc.) was added and the ingredients were well mixed with a kneader at 60° C. to prepare a resin composition (I). This composition was sandwiched between glass sheets to give a total thickness of 2 mm and thereafter cured at 180° C. for 2 hours to prepare a resin sheet. In a separate step, the resin composition (I) was impregnated in unidirectionally collimated carbon fibers (Pyrofil M-1, Trademark of Mitsubishi Rayon Co., Ltd.) by a hot melt process to prepare a unidirectional prepreg having a fiber areal weight of 145 g/m² and a resin content of 35 wt%. Sheets of this prepreg were laid up to unidirectional laminate [0°]₁₆ and quasi-isotropical laminate [+45°/0°/−45°/+90°]₄S, and cured at 180° C. for 2 hOurs to prepare a composite material. The results of tests conducted on the resin sheet and composite are shown in Table 1.

EXAMPLES 2 TO 4 AND COMPARATIVE EXAMPLES 1 TO 6

Tests were conducted on the samples that were prepared as in Example 1 except that the proportions of the respective ingredients were changed as shown in Table 1. The results are also shown in Table 1.

EXAMPLES 5 TO 9

Tests were conducted on the samples that were prepared as in Example 1 except that the ingredients were changed as shown in Table 1. The results are also shown in Table 1. In these examples, Epikote 828 was used as bifunctional epoxy resin (A) which was a bisphenol A diglycidyl ether type epoxy available from Yuka-Shell Epoxy Co., Ltd. and which had an epoxy equivalent of 188.

EXAMPLE 10

The recipe of Example 1 was employed except that Epikote 807 was divided into two portions, one of which was subjected to a preliminary reaction with components (B) and (C) in the following way: 68 parts of Epikote 807 was reacted with 142 parts of N,N,O-triglycidyl-4-amino-m-cresol and 206 parts of 4,4'-(p-phenylenediisopropylidene)bis(2,6-xylenol) at 135° C. for 4 hours and the mixture was thereafter cooled to 60° C.; to the cooled mixture, the remaining part (32 parts) of Epikote 807, 63.8 parts of 4,4'-diaminodiphenyl sulfone, and 1.25 parts of a fine silicon oxide powder (Aerosil 380) were added and the ingredients were well mixed in a kneader (held at 60° C.) to prepare a resin composition (II). A resin sheet and a composite were prepared as in Example 1 except that the so prepared resin composition (II) was used in place of resin composition (I). The results of tests conducted on the samples are shown in Table 2.

EXAMPLES 11 TO 16 AND COMPARATIVE EXAMPLES 7 TO 12

Tests were conducted on the samples that were prepared as in Example 10 except that the proportions of the respective ingredients or the degree of preliminary reaction (Example 16) was changed as shown in Table 2. The results are also shown in Table 2.

TABLE 1

| | Bifunctional epoxy resin (A) | Trifunctional eposy resin (B) | Phenolic compound (C) | Curing agent (D) | A/B | (A + B)/C | (A + B − C)/D |
| --- | --- | --- | --- | --- | --- | --- | --- |
| Example 1 | Epikote 807 | N,N,O—triglycidyl-4-amino-m-cresol | 4,4'-(p-phenylenediisopropylidene)bis-(2,6-xylenol) | 4,4'-diaminodiphenyl sulfone | 1/2.5 | 1/0.5 | 1/1 |
| 2 | " | N,N,O—triglycidyl-4-amino-m-cresol | 4,4'-(p-phenylenediisopropylidene)bis-(2,6-xylenol) | 4,4'-diaminodiphenyl sulfone | 1/3.2 | 1/0.5 | " |
| 3 | " | N,N,O—triglycidyl-4-amino-m-cresol | 4,4'-(p-phenylenediisopropylidene)bis-(2,6-xylenol) | 4,4'-diaminodiphenyl sulfone | 1/1.5 | 1/0.7 | " |
| 4 | " | N,N,O—triglycidyl-4-amino-m-cresol | 4,4'-(p-phenylenediisopropylidene)bis-(2,6-xylenol) | 4,4'-diaminodiphenyl sulfone | 1/0.5 | 1/0.3 | 1/1.2 |
| Comparative Example 1 | " | N,N,O—triglycidyl-4-amino- | 4,4'-(p-phenylenediisopropyli- | 4,4'-diaminodiphenyl | 1/0.08 | 1/0.5 | 1/1 |

TABLE 1-continued

| | | | m-cresol | dene)bis-(2,6-xylenol) | sulfone | | | |
|---|---|---|---|---|---|---|---|---|
| | 2 | " | N,N,O—triglycidyl-4-amino-m-cresol | 4,4'-(p-phenylenediisopropylidene)bis-(2,6-xylenol) | 4,4'-diaminodiphenyl sulfone | 1/4.5 | " | " |
| | 3 | " | N,N,O—triglycidyl-4-amino-m-cresol | 4,4'-(p-phenylenediisopropylidene)bis-(2,6-xylenol) | 4,4'-diaminodiphenyl sulfone | 1/2.5 | 0.08 | " |
| | 4 | " | N,N,O—triglycidyl-4-amino-m-cresol | 4,4'-(p-phenylenediisopropylidene)bis-(2,6-xylenol) | 4,4'-diaminodiphenyl sulfone | " | 1.1 | " |
| | 5 | " | N,N,O—triglycidyl-4-amino-m-cresol | 4,4'-(p-phenylenediisopropylidene)bis-(2,6-xylenol) | 4,4'-diaminodiphenyl sulfone | " | 1/0.5 | 1/0.7 |
| | 6 | " | N,N,O—triglycidyl-4-amino-m-cresol | 4,4'-(p-phenylenediisopropylidene)bis-(2,6-xylenol) | 4,4'-diaminodiphenyl sulfone | " | " | 1/1.5 |
| Example | 5 | Epikote 828 | N,N,O—triglycidyl-4-amino-m-cresol | 4,4'-(p-phenylenediisopropylidene)bis-(2,6-xylenol) | 4,4'-diaminodiphenyl sulfone | 1/2.5 | 1/0.5 | 1/1 |
| | 6 | " | N,N,O—triglycidyl-p-aminophenol | 4,4'-(p-phenylenediisopropylidene)bis-(2,6-xylenol) | 4,4'-diaminodiphenyl sulfone | " | " | " |
| | 7 | " | N,N,O—triglycidyl-p-aminophenol | 4,4'-(p-phenylenediisopropylidene)bis-(2,-cresol) | 4,4'-diaminodiphenyl sulfone | " | " | " |
| | 8 | " | N,N,O—triglycidyl-p-aminophenol | 4,4'-(p-phenylenediisopropylidene)bis-(2,-cresol) | 3,3'-diaminodiphenyl sulfone | " | " | " |
| | 9 | " | N,N,O—triglycidyl-p-aminophenol | 4,4'-(p-phenylenediisopropylidene)bisphenol | 3,3'-diaminodiphenyl sulfone | " | " | " |

| | | Handling property | Resistance to MEK | 0° Compressive strength after moisture absorption at 82° C. kg/mm$^2$ | Compressive strength after impact at room temperature kg/mm$^2$ |
|---|---|---|---|---|---|
| Example | 1 | | | 116 | 30 |
| | 2 | | | 125 | 29 |
| | 3 | | | 111 | 33 |
| | 4 | | | 115 | 34 |
| Comparative Example | 1 | | X | 92 | 28 |
| | 2 | | | 127 | 24 |
| | 3 | | | 100 | 25 |
| | 4 | | X | 93 | 31 |
| | 5 | | X | 90 | 30 |
| | 6 | | X | 100 | 28 |
| Example | 5 | | | 122 | 30 |
| | 6 | | | 115 | 31 |
| | 7 | | | 110 | 33 |
| | 8 | | | 115 | 30 |
| | 9 | | | 112 | 32 |

TABLE 2

| | Components subjected to preliminary reaction | | | Components not subjected to preliminary reaction | |
|---|---|---|---|---|---|
| | Bifunctional eposy resin (A') | Trifunctional epoxy resin (B) | Phenolic compound (C) | Binfunctional epoxy resin (A") | Curing agent (D) |
| Example 10 | Epikote 807 | N,N,O—triglycidyl-4-amino-m-cresol | 4,4'-(p-phenylenediisopropylidene)-bis(2,6-xylenol) | Epikote 807 | 4,4'-di-aminodiphenyl-sulfone |
| 11 | " | N,N,O—triglycidyl-4-amino-m-cresol | 4,4'-(p-phenylenediisopropylidene)-bis(2,6-xylenol) | " | 4,4'-di-aminodiphenyl-sulfone |
| 12 | " | N,N,O—triglycidyl-4-amino-m-cresol | 4,4'-(p-phenylenediisopropylidene)-bis(2,6- | " | 4,4'-di-aminodiphenyl-sulfone |

TABLE 2-continued

| | | | | | |
|---|---|---|---|---|---|
| 13 | " | N,N,O—triglycidyl-4-amino-m-cresol | 4,4'-(p-phenylenediisopropylidene)-bis(2,6-xylenol) | " | 4,4'-di-aminodiphenylsulfone |
| 14 | " | N,N,O—triglycidyl-4-amino-m-cresol | 4,4'-(p-phenylenediisopropylidene)-bis(2,6-xylenol) | " | 4,4'-di-aminodiphenylsulfone |
| 15 | " | N,N,O—triglycidyl-4-amino-m-cresol | 4,4'-(p-phenylenediisopropylidene)-bis(2,6-xylenol) | " | 4,4'-di-aminodiphenylsulfone |
| Comparative Example 7 | " | N,N,O—triglycidyl-4-amino-m-cresol | 4,4'-(p-phenylenediisopropylidene)-bis(2,6-xylenol) | " | 4,4'-di-aminodiphenylsulfone |
| 8 | " | N,N,O—triglycidyl-4-amino-m-cresol | 4,4'-(p-phenylenediisopropylidene)-bis(2,6-xylenol) | " | 4,4'-di-aminodiphenylsulfone |
| 9 | " | N,N,O—triglycidyl-4-amino-m-cresol | 4,4'-(p-phenylenediisopropylidene)-bis(2,6-xylenol) | " | 4,4'-di-aminodiphenylsulfone |
| 10 | " | N,N,O—triglycidyl-4-amino-m-cresol | 4,4'-(p-phenylenediisopropylidene)-bis(2,6-xylenol) | " | 4,4'-di-aminodiphenylsulfone |
| 11 | " | N,N,O—triglycidyl-4-amino-m-cresol | 4,4'-(p-phenylenediisopropylidene)-bis(2,6-xylenol) | " | 4,4'-di-aminodiphenylsulfone |
| 12 | " | N,N,O—triglycidyl-4-amino-m-cresol | 4,4'-(p-phenylenediisopropylidene)-bis(2,6-xylenol) | " | 4,4'-di-aminodiphenylsulfone |
| Example 16 | " | N,N,O—triglycidyl-4-amino-m-cresol | 4,4'-(p-phenylenediisopropylidene)-bis(2,6-xylenol) | " | 4,4'-di-aminodiphenylsulfone |

| | A'/B | (A' + B)/C | Pre-reaction condition (Degree of conversion of —OH in (C)) | (A' + A" + B)/C | (A' + A" + B− C)/D |
|---|---|---|---|---|---|
| Example 10 | 1/3.7 | 1/0.55 | 135° C. × 4 hr (95%) | 1/0.5 | 1/1 |
| 11 | 1/2.5 | 1/0.55 | 135° C. × 4 hr (95%) | 1/0.5 | " |
| 12 | 1/1.5 | 1/0.8 | 135° C. × 4 hr (95%) | 1/0.7 | " |
| 13 | 1/3.7 | 1/0.8 | 135° C. × 4 hr (95%) | 1/0.7 | " |
| 14 | 1/2.5 | 1/0.55 | 135° C. × 4 hr (95%) | 1/0.5 | " |
| 15 | 1/1 | 1/0.55 | 135° C. × 4 hr (95%) | 1/0.3 | 1/1.2 |
| Comparative Example 7 | 1/0.1 | 1/0.55 | 135° C. × 4 hr (95%) | 1/0.5 | 1/1 |
| 8 | 1/4.5 | 1/0.55 | 135° C. × 4 hr (95%) | 1/0.5 | " |
| 9 | 1/3.7 | 1/0.1 | 135° C. × 4 hr (95%) | 1/0.08 | " |
| 10 | 1/3.7 | 1/1.2 | 135° C. × 4 hr (95%) | 1/1.0 | " |
| 11 | 1/3.7 | 1/0.55 | 135° C. × 4 hr (95%) | 1/0.5 | 1/0.7 |
| 12 | 1/3.7 | 1/0.55 | 135° C. × 4 hr (95%) | 1/0.5 | 1/1.5 |
| Example 16 | 1/1.5 | 1/0.8 | 135° C. × 2 hr (50%) | 1/0.7 | 1/1 |

| | Handling property | Resistance to MEK | 0° Compressive strength after moisture absorption at 82° C. kg/mm$^2$) | Compressive strength after impact at room temperature kg/mm$^2$) |
|---|---|---|---|---|
| Example 10 | | | 115 | 32 |
| 11 | | | 110 | 32 |
| 12 | | | 112 | 34 |
| 13 | | | 115 | 30 |

TABLE 2-continued

|  |  |  |  |
|---|---|---|---|
| 14 |  | 110 | 33 |
| 15 |  | 115 | 34 |
| Comparative Example 7 |  | 95 | 29 |
| 8 | X | — | — |
| 9 |  | 95 | 23 |
| 10 | X | — | — |
| 11 | X (col 2) | 105 | 25 |
| 12 | X (col 2) | 100 | 27 |
| Example 16 |  | 112 | 32 |

Note: The term "A'" represents the number of epoxy groups by moles in element (A) not subjected to the pre-reaction.

As is clear from the results shown in Table 1 and Table 2, the samples according to the present invention had good handling and MEK resistance properties, and further, the samples according to the present invention were excellent in compressive strength characteristics as compared to the comparative samples. With regard to Comparative Example Nos. 8 and 10, the samples could not be prepared because of the high reaction degree (Comparative Example 8) and the gelation (Comparative Example 10) at the pre-reaction.

COMPARATIVE EXAMPLE 13

Test was conducted on the sample that was prepared as in Example 1 except that resin composition (I) was replaced by a mixture of 100 parts of N,N,N',N'-tetraglycidyl diaminodiphenylmethane and 52 parts of 4,4'-diaminodiphenyl sulfone. The sample had good handling and MEK resistance properties but its compressive strength characteristics were unbalanced, i.e., 130 kg/mm$^2$ at 82° C. after moisture absorption and 15 kg/mm$^2$ after impact.

While the invention has been described in detail and with reference to specific embodiments thereof, it will be apparent to one skilled in the art that various changes and modifications can be made therein without departing from the spirit and scope thereof.

What is claimed is:

1. An epoxy resin composition which comprises the following elements:
   (A) a bifunctional epoxy resin;
   (B) a trifunctional epoxy resin;
   (C) a phenolic compound represented by the following general formula:

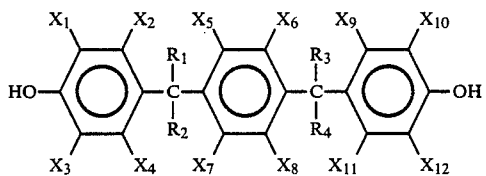

wherein $X_1$, $X_2$, $X_3$, $X_4$, $X_5$, $X_6$, $X_7$, $X_8$, $X_9$, $X_{10}$, $X_{11}$, $X_{12}$, $R_1$, $R_2$, $R_3$ and $R_4$, which may be the same or different, each represents a hydrogen atom or a methyl group; and
   (D) 4,4'-diaminodiphenyl sulfone or 3,3'-diaminodiphenyl sulfone, wherein the molar ratio of epoxy groups in element (A) to those in element (B) is in the range of from 1/4.0 to 0.1, element (C) is used in an amount that satisfies the condition:

$$1/0.9 \leq (A+B)/C \leq 1/0.1$$

and element (D) is used in an amount that satisfies the condition:

$$1/1.3 \leq (A+B-C)/D \leq 1/0.8$$

wherein A represents the number of epoxy groups by moles in element (A), B represents the number of epoxy groups by moles in element (B), C represents the number of phenolic hydroxyl groups by moles in element (C), and D represents the number of NH groups by moles in element (D).

2. An epoxy resin composition as in claim 1, wherein said bifunctional epoxy resin (A) is a glycidyl ether compound derivatived from bisphenol A or bisphenol F epoxy resin.

3. An epoxy resin composition as in claim 1, wherein said trifunctional epoxy resin (B) is selected from the group consisting of N,N,O-triglycidyl-p-aminophenol, N,N,O-triglycidyl-m-aminophenol, N,N,O-triglycidyl-4-amino-m-cresol, N,N,O-triglycidyl-5-amino-o-cresol, and 1,1,1-(triglycidyl-oxyphenyl)methane.

4. An epoxy resin composition as in claim 1, wherein said phenolic compound (C) is 4,4'-(p-phenylenediisopropylidene)bis(2,6-xylenol).

5. An epoxy resin composition as in claim 1, wherein the molar ratio of epoxy groups in element (A) to those in element (B) is in the range of from 1/3.8 to 1/0.3.

6. An epoxy resin composition which comprises the following elements:
   (A) a bifunctional epoxy resin;
   (B) a trifunctional epoxy resin;
   (C) a phenolic compound represented by the following general formula:

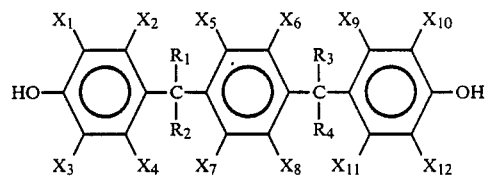

wherein $X_1$, $X_2$, $X_3$, $X_4$, $X_5$, $X_6$, $X_7$, $X_8$, $X_9$, $X_{10}$, $X_{11}$, $X_{12}$, $R_1$, $R_3$ and $R_4$, which may be the same or different, each represents a hydrogen atom or a methyl group; and
   (D) 4,4'-diaminodiphenyl sulfone or 3,3'-diaminodiphenyl sulfone, wherein all or part of element (A) and all of element (B) are pre-reacted with element (C) under the condition that at least 80% of the phenolic hydroxyl groups in element (C) reacts with the epoxy groups in elements (A) and (B), wherein the molar ratio of epoxy groups in element (A) to those in element (B) in the pre-reaction is in the range of from 1/4.0 to 1/0.5 and element (C) is used in an amount that satisfies the conditions:

$$1/1.1 \leq (A'+B)/C \leq 1/0.2, \text{ and}$$

$$1/0.9 \leq (A+B)/C \leq 1/0.1$$

and, wherein element (D) is used in an amount that satisfies the condition:

$$1/1.3 \leq (A+B-C)/D \leq 1/0.8$$

wherein A' represents the number of epoxy groups by moles in element (A) subjected to the pre-reaction, A represents the total number of epoxy groups by moles in element (A), B represents the number of epoxy groups by moles in element (B), C represents the number of phenolic hydroxyl groups by moles in element (C), and D represents the number of NH groups by moles in element (D).

7. An epoxy resin composition as in claim 6, wherein said bifunctional epoxy resin (A) is a bisphenol A type or bisphenol F type epoxy resin.

8. An epoxy resin composition as in claim 6, wherein said trifunctional epoxy resin (B) is selected from the group consisting of N,N,O-triglycidyl-p-aminophenol, N,N,O-triglycidyl-m-aminophenol, N,N,O-triglycidyl-4-amino-m-cresol, N,N,O-triglycidyl-5-amino-o-cresol, and 1,1,1-(triglycidyl-oxyphenyl)methane.

9. An epoxy resin composition as in claim 6, wherein said phenolic compound (C) is 4,4'-(p-phenylenediisopropylidene)bis(2,6-xylenol).

10. An epoxy resin composition as in claim 6, wherein the molar ratio of epoxy groups in element (A) to those in element (B) is in the range of from 1/3.7 to 1/0.7.

11. A prepreg for composite materials, wherein said prepreg comprises reinforcing fibers impregnated with an epoxy resin composition which comprises the following elements:
(A) a bifunctional epoxy resin;
(B) a trifunctional epoxy resin;
(C) a phenolic compound represented by the following general formula:

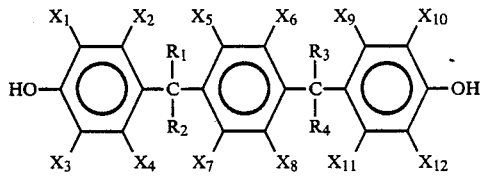

wherein $X_1$, $X_2$, $X_3$, $X_4$, $X_5$, $X_6$, $X_7$, $X_8$, $X_9$, $X_{10}$, $X_{11}$, $X_{12}$, $R_1$, $R_2$, $R_3$ and $R_4$, which may be the same or different, each represents a hydrogen atom or a methyl group; and
(D) 4,4'-diaminodiphenylsulfone or 3,3'-diamino-diphenylsulfone, wherein the molar ratio of epoxy groups in element (A) to those in element (B) is in the range of from 1/4.0 to 0.1, element (C) is used in an amount that satisfies the condition:

$$1/0.9 \leq (A+B)C \leq 1/0.1$$

and element (D) is used in an amount that satisfies the condition:

$$1/1.3 \leq (A+B-C)/D \leq 1/0.8$$

wherein A represents the number of epoxy groups by moles in element (A), B represents the number of epoxy groups by moles in element (B), C represents the number of phenolic hydroxyl groups by moles in element (C), and D represents the number of NH groups by moles in element (D).

12. A prepreg for composite materials as in claim 11, wherein said bifunction epoxy resin (A) is a glycidyl ether compound derived from bisphenol A or bisphenol F.

13. A prepreg for composite materials as in claim 11, wherein said trifunctional epoxy resin (B) is selected from the group consisting of N,N,O-triglycidyl-p-aminophenol, N,N,O-triglycidyl-m-aminophenol, N,N,O-triglycidyl-4-amino-m-cresol, N,N,O-triglycidyl-5-amino-o-cresol, and 1,1,1-(triglycidyl-oxyphenyl)methane.

14. A prepreg for composite materials as in claim 11, wherein said phenolic compound (C) is 4,4'-(p-phenylenediisopropylidene)bis(2,6-xylenol).

15. A prepreg for composite materials as in claim 11, wherein the molar ratio of epoxy groups in element (A) to those in element (B) is in the range of from 1/3.8 to 1/0.3.

16. A prepreg for composite materials as in claim 11, wherein said reinforcing fibers are carbon fibers.

17. A prepreg for composite materials, wherein said prepreg comprises reinforcing fibers impregnated with an epoxy resin composition which comprises the following elements:
(A) a bifunctional epoxy resin;
(B) a trifunctional epoxy resin;
(C) a phenolic compound represented by the following general formula:

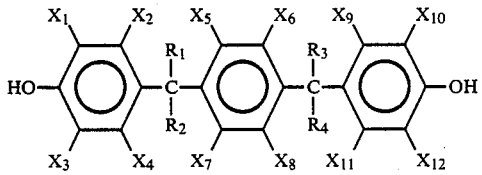

wherein $X_1$, $X_2$, $X_3$, $X_4$, $X_5$, $X_6$, $X_7$, $X_8$, $X_9$, $X_{10}$, $X_{11}$, $X_{12}$, $R_1$, $R_2$, $R_3$ and $R_4$, which may be the same or different, each represents a hydrogen atom or a methyl group; and
(D) 4,4'-diaminodiphenyl sulfone or 3,3'-diaminodiphenyl sulfone, wherein all or part of element (A) and all of element (B) are pre-reacted with element (C) under the condition that at least 80% of the phenolic hydroxyl groups in element (C) reacts with the epoxy groups in elements (A) and (B), wherein the molar ratio of epoxy groups in element (A) to those in element (B) in the pre-reaction is in the range of from 1/4.0 to 1/0.5 and element (C) is used in an amount that satisfies the conditions:

$$1/1.1 \leq (A'+B)/C \leq 1/0.2, \text{ and}$$

$$1/0.9 \leq (A+B)/C \leq 1/0.1$$

and, wherein element (D) is used in an amount that satisfies the condition:

$$1/1.3 \leq (A+B-C)/D \leq 1/0.8$$

wherein A' represents the number of epoxy groups by moles in element (A) subjected to the pre-reaction, A represents the total number of epoxy groups by moles in element (A), B represents the number of epoxy groups by moles in element (B), C represents the number of phenolic hydroxyl groups by moles in element (C), and D represents the number of NH groups by moles in element (D).

18. A prepreg for composite materials as in claim 17, wherein said bifunctional epoxy resin (A) is a glycidyl either compound derived from bisphenol A or bisphenol F.

19. A prepreg for composite materials as in claim 17, wherein said trifunctional epoxy resin (B) is selected from the group consisting of N,N,O-triglycidyl-p-aminophenol, N,N,O-triglycidyl-m-aminophenol, N,N,O-triglycidyl-4-amino-m-cresol, N,N,O-triglycidyl-5-amino-o-cresol, and 1,1,1-(triglycidyl-oxyphenyl)methane.

20. A prepreg for composite materials as in claim 17, wherein said phenolic compound (C) is 4,4'-(p-phenylenediisopropylidene)bis(2,6-xylenol).

21. A prepreg for composite materials as in claim 17, wherein the molar ratio of epoxy groups in element (A) to those in element (B) is in the ran9e of from 1/3.7 to 1/0.7.

22. A prepreg for composite materials as in claim 17, wherein said reinforcing fibers are carbon fibers.

* * * * *